Apr. 3, 1923.

A. J. REBSTOCK

CONVEYER

Filed May 22, 1922

Inventor:
August J. Rebstock,
by Carr & Carr,
his Attorneys.

Apr. 3, 1923.
A. J. REBSTOCK
CONVEYER
Filed May 22, 1922 2 sheets-sheet 2
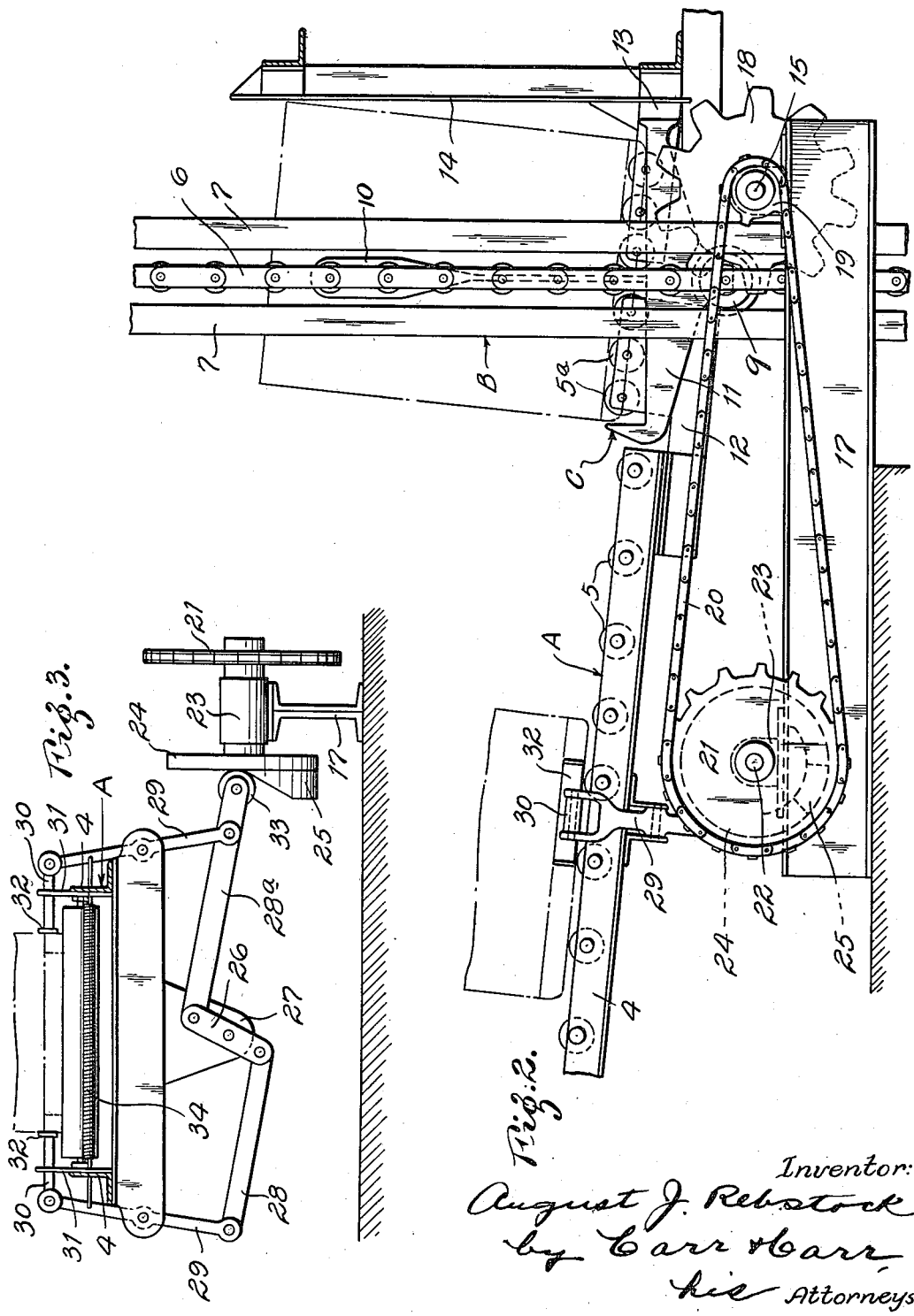
Inventor:
August J. Rebstock
by Carr & Carr
his Attorneys Patented Apr. 3, 1923.

1,450,226

UNITED STATES PATENT OFFICE.

AUGUST J. REBSTOCK, OF ST. LOUIS, MISSOURI, ASSIGNOR TO ALVEY MANUFACTURING COMPANY, OF ST. LOUIS, MISSOURI.

CONVEYER.

Application filed May 22, 1922. Serial No. 562,694.

*To all whom it may concern:*

Be it known that I, AUGUST J. REBSTOCK, a citizen of the United States, and a resident of the city of St. Louis and State of Missouri, have invented a certain new and useful Improvement in Conveyers, of which the following is the specification.

This invention relates to automatic package conveyers, and more particularly to mechanism for controlling the delivery of the packages from a gravity package conveyer to a power driven package elevator.

One of the principal objects of the present invention is to provide a simple and efficient stop mechanism for holding the packages in check on the gravity conveyer and to operatively connect and correlate said stop mechanism with the elevator mechanism so that the packages are released by the stop mechanism one at a time and at intervals so timed that the released packages are delivered to the carriers of the elevator as they come successively into receiving relation to the gravity conveyer. Other objects are reduced cost of manufacture and installation and compactness of design.

The invention consists in the improved stop mechanism for controlling the delivery of packages to the elevator; and it also consists in the arrangements and combinations of parts hereinafter described and claimed.

In the accompanying drawing, which forms part of this specification, and wherein like symbols refer to like parts wherever they occur, Fig. 1 is a fragmentary plan view of the adjacent portions of a gravity conveyer and a vertical elevator provided with a stop mechanism embodying my invention;

Fig. 2 is a side elevation thereof; and

Fig. 3 is a vertical section on the line 3—3 in Fig. 1.

Figure 1:
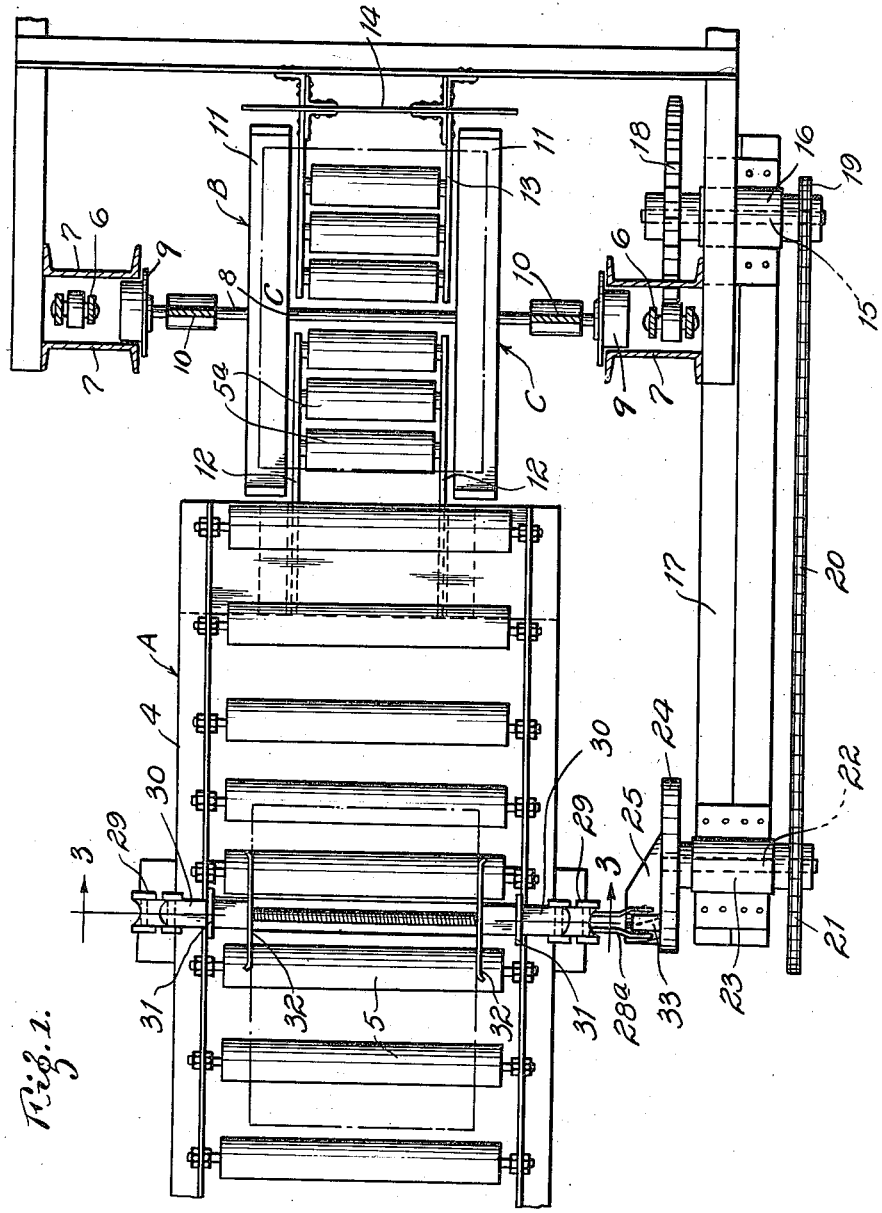

The conveying device shown in the accompanying drawing comprises a gravity package conveyer A and a vertical power driven package elevator B. The gravity conveyer, of which only the delivery end is shown, is of the usual type and comprises spaced side rails 4 having a bed of rollers 5 rotatably supported thereon and over which the packages travel to the elevator B. The elevator B, of which only a fragmentary portion is shown, is of the usual endless chain type and comprises carriers or traveling platforms C supported between a pair of endless sprocket chains 6, which are vertically arranged in parallel planes and spaced apart horizontally. The sprocket chains 6 travel between vertical guides 7, which form part of the upright elevator frame. A carrier comprises a bottom cross bar 8 provided at each end with a flanged wheel 9 adapted to travel between the vertical guides 7 of the elevator frame. Each carrier is suspended between the pair of sprocket chains 6 by hanger bars 10 which are fastened to each end of the cross bar 8 and are pivotally connected to the sprocket chains. Rigidly fastened to the cross bar 8 of each carrier, adjacent to each end thereof, are horizontal supporting bars 11, which extend cross-wise of the cross bar 8 and constitute a platform upon which the package is supported while being elevated.

The elevator is provided adjacent to the delivery end of the gravity conveyer, with an inclined bed of rollers $5^a$, which are disposed parallel with the rollers 5 of the gravity conveyer and form a continuation thereof. These rollers are located in the path of the carriers and are rotatably supported between pairs of horizontally spaced supporting plates 12 and 13 that are rigidly secured to the framework of the gravity conveyer and the elevator, respectively, inside of the path of the package supporting bars 11 of the carriers so as to be clear thereof during the upward travel of said carriers. A sufficient space is also left between the adjacent ends of the supporting plates 12 and 13 to permit the bottom cross bars 8 of the carriers to pass therebetween. The elevator framework is provided with a suitable stop plate 14 adapted to prevent the packages from sliding off the inclined bed of supporting rollers $5^a$.

Fixed to one end of a shaft 15 journaled in a horizontal bearing 16 mounted on the uppermost flanges of horizontally extending channel members 17 is a large sprocket wheel 18. The channel members 17 are rigidly secured together back to back and extend forwardly from the elevator frame alongside of the gravity conveyer. The sprocket wheel 18 meshes with the upwardly moving stretch of one of the endless elevator chains 6 to be thereby rotated. A second sprocket wheel 19 is fixed to the other end of the shaft 15 and is connected by means of a sprocket chain 20 to a larger sprocket wheel 21 fixed to one end of a shaft 22 journaled in a horizontal bearing 23 located at the forward end of the channel members 17. Fixed to the opposite end of the shaft 22 is a circular disk 24 provided with an arcuate cam lug 25.

The stop mechanism comprises a lever 26 pivotally supported midway of its length by means of a lug or bracket 27 depending from the underside of the frame of the gravity package way A midway of the spaced side rails thereof. This lever is fulcrumed on a horizontal pivot for vertical swinging movement crosswise of the package way. Links 28 and 28$^a$ are pivotally secured to the opposite arms of the lever 26 and extend on opposite sides thereof beyond the side rails of the conveyer. Upright levers 29 are arranged on opposite sides of the conveyer, in alinement crosswise thereof, and are pivotally secured thereto midway of their ends for vertical swinging movement crosswise of the conveyer. The lower arms of the levers 29 are pivotally secured to the outer ends of the oppositely extending links 28 and 28$^a$; and the upper arms of said upright levers are pivotally secured to the outer ends of axially alined stop-plungers 30 arranged for horizontal sliding movement in brackets 31 secured to the side rails of the conveyer. The free inner ends of the plungers 30 are provided with horizontal extending stop plates 32 adapted to engage the packages.

The link 28$^a$, which extends in the direction of the rotary cam disk 24 is extended beyond its point of connection with the upright lever 29 and has a cam roller 33 journaled thereon adapted for rolling contact with the inner face of said cam disk and the cam lug 25 thereon. The cam roller 33 is held in yielding contact with the cam surface of the disk 24 and the stop plates 32 are held in yielding contact with the packages by means of a coiled tension spring 34. This spring is located below the bed of the gravity conveyer and is connected at its opposite ends with the upper arms of the upright stop levers 29 and tends to draw the pair of alined stop plungers towards each other into the path of the packages.

With the arrangement described, packages that are to be delivered to the carriers of the elevator are loaded on the receiving end of the inclined gravity conveyer and travel along the same towards the delivery end thereof until the foremost package is arrested by the oppositely disposed stop plates, thereby holding the entire line of packages in check on the conveyer. As the elevator sprocket chains 6 travel upwardly and raise the carriers C with them, the sprocket wheel 18 on the shaft 15 is rotated and the motion thereof is transmitted by means of sprocket wheels 19 and 21 and the sprocket chain 20 to the shaft 22 having the cam disk 24 fixed thereto. During each revolution of this cam disk, the arcuate cam lug 25 thereon engages the cam roller 33 journaled in the outer end of the link 28$^a$ and thus forces said link inwardly, which action, by reason of the pivoted connecting lever 26, causes the opposite link 28 to be drawn inwardly. This inward movement of the links 28 and 28$^a$ causes the upper arms of the upright stop levers 29 to swing outwardly, whereby the alined stop plungers 30 are withdrawn from engagement with the foremost package, thus releasing the same and permitting said package to slide off the delivery end of the gravity conveyer upon the supporting rollers 5$^a$ of the elevator where the package is brought to a stop in the path of the upwardly moving carrier C by means of the stop plate 14. The package is then engaged by an upwardly moving carrier and lifted off the supporting rollers 5$^a$. The stop-plungers are withdrawn from engagement with the foremost package a length of time sufficient to permit the said package to move clear of said stop plungers and to permit the succeeding package to move therebetween. This arrangement permits the packages to be delivered to the elevator one at a time regardless of the rapidity with which they are loaded on the roller conveyer. The loading mechanism is actuated at predetermined intervals and in timed relation to the elevator; that is, the stop actuating mechanism is so correlated with the elevator mechanism that the packages are released in time to reach the elevator just before the carriers thereof are ready to receive them so that no time is lost in loading the carriers.

The hereinbefore described stop mechanism admits of considerable modification without departing from my invention. Therefore, I do not wish to be limited to the details of construction shown and described.

What I claim is:

1. The combination with a traveling package conveyer and a stationary package way communicating with said conveyer, of package engaging devices disposed on opposite sides of said way and arranged for joint movement towards and away from each other into and out of a line of packages on the way, and means operating in timed relation to said traveling conveyer for moving said package engaging devices away from each other to permit a package to pass therebetween.

2. The combination with a traveling package conveyer and a stationary package way communicating with said conveyer, of package engaging devices disposed on opposite sides of said way and arranged for joint movement towards and away from each other into and out of a line of packages on the way, means operating in timed relation to said traveling conveyer for moving said package engaging devices away from each other to permit a package to pass therebetween, and means for yieldably holding said package engaging devices in position to engage the packages on said way.

3. The combination with a traveling package conveyer and a stationary package way communicating with said conveyer, of package engaging devices disposed on opposite sides of said way and arranged for movement towards and away from each other into and out of a line of packages on the way, and means for moving said package engaging devices away from each other to permit a package to pass therebetween, said means comprising a rotary cam device operatively connected with said traveling conveyer and operating in timed relation therewith.

4. The combination with a traveling package conveyer and a stationary way communicating with said conveyer, of package engaging devices disposed on opposite sides of said way adjacent to the delivery end thereof and linked together for joint bodily movement towards and away from each other into and out of a line of packages on the way, and means operatively connected to said conveyor for actuating said package engaging devices at predetermined intervals to permit a package to pass therebetween.

5. The combination with a power driven package conveyer and an inclined package way communicating therewith, of a pair of oppositely disposed stop devices located one on each side of said package way and linked together for joint sliding movement towards and away from each other into and out of a line of packages on said way, a continuously rotating cam device operatively connected to said conveyer for actuating said pair of stop devices to cause the same to move away from each other at predetermined intervals, and means for yieldably holding stop devices in position to engage the packages, said means being also adapted to hold said stop devices in cooperative relation with said rotating cam device.

6. The combination with a power driven conveyer and a gravity conveyer communicating with said power driven conveyer, of a pair of stop devices located adjacent to the delivery end of said gravity conveyer and disposed one on each side thereof, said pair of stop devices being mounted for sliding movement towards and away from each other into and out of a line of packages on said gravity conveyer, upright lever supports for said stop devices, transverse links connecting said lever supports, and a rotary cam operatively connected with said power driven conveyer to be driven thereby, said cam being arranged to engage one of said connecting links, whereby said stop devices are moved out of the line of packages at predetermined intervals.

7. The combination with a power driven conveyer and a gravity conveyer communicating with said power driven conveyer, of a pair of stop devices located adjacent to the delivery end of said gravity conveyer and disposed one on each side thereof, said pair of stop devices being mounted for sliding movement towards and away from each other into and out of a line of packages on said gravity conveyer, upright lever supports for said stop devices, transverse links connecting said lever supports, a rotary cam operatively connected with said power driven conveyer to be driven thereby, said cam being arranged to engage one of said connecting links whereby said stop devices are moved out of the line of packages at predetermined intervals, and means for yieldably holding said stop devices in the line of packages and said link in engagement with said cam.

Signed at St. Louis, Missouri, this 18th day of May, 1922.

AUGUST J. REBSTOCK.